Figure 1:
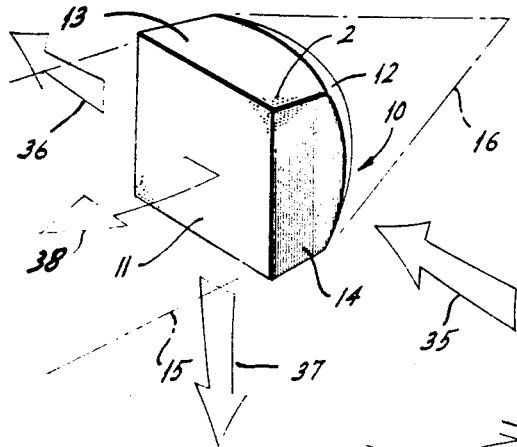

Dec. 20, 1966  R. W. FOX ETAL  3,293,649
OPEN-WORK DIELECTRIC LENS TO PROVIDE FOR AIR COOLING
Filed April 19, 1963  3 Sheets-Sheet 1

INVENTORS
RALPH W. FOX
MURRAY HOFFMAN
BY Frank D. Prager
ATTORNEY

Dec. 20, 1966 R. W. FOX ETAL 3,293,649
OPEN-WORK DIELECTRIC LENS TO PROVIDE FOR AIR COOLING
Filed April 19, 1963 3 Sheets-Sheet 2

INVENTORS
RALPH W. FOX
MURRAY HOFFMAN
BY
ATTORNEY

Dec. 20, 1966    R. W. FOX ETAL    3,293,649
OPEN-WORK DIELECTRIC LENS TO PROVIDE FOR AIR COOLING
Filed April 19, 1963    3 Sheets-Sheet 3

INVENTORS
RALPH W. FOX
MURRAY HOFFMAN
BY
Frank D Prager
ATTORNEY

United States Patent Office 3,293,649
Patented Dec. 20, 1966

3,293,649
OPEN-WORK DIELECTRIC LENS TO PROVIDE FOR AIR COOLING
Ralph W. Fox, Blue Bell, and Murray Hoffman, Rydal, Pa., assignors to Philco Corporation, Philadelphia, Pa., a corporation of Delaware
Filed Apr. 19, 1963, Ser. No. 274,259
8 Claims. (Cl. 343—911)

Our invention relates to microwave lenses and loads, and to methods of constructing the same. The expressions "lens" and "load" are meant in a broad sense when used herein; the apparatus may serve to retard microwaves and thereby to refract or absorb wave energy, or to focus such energy, to guide or confine it, disperse it spectrally, or dispose of it in other ways. It is known that incident to such operations, heat is generated in the lens or load. The invention has to do with the construction of lens and load units, and provides for ventilation of these units in such manner as to prevent undesirable accumulation of heat.

To some extent it was possible to ventilate the dielectric material of prior lenses, particularly by constructing the lenses in form of bundles or arrays of tubular ducts. It was then possible for instance for convection currents of air to pass through the lens. However, little could be achieved with such arrangements, not only because in many instances the accumulation of heat is such as to call for the application of large, directed air currents, but also because it would not always be convenient to use a single, predetermined pattern of ventilation, such as an air current entering at one surface of a lens, passing through parallel ducts, and removed at the opposite surface of the lens. It is often preferable, and is therefore an object of our invention, to construct the lens or load in such a way that ventilating air can circulate through it in different directions. Briefly, the ventilating pattern should be as flexible as possible.

We found that materials thus far available for the construction of lenses and loads were not usable in very flexible ways and that they were far from being simple or inexpensive when utilized in the construction of such a unit. It therefore is an object of our invention to provide an improved material for the construction of microwave lenses and loads, and particularly to make such material inexpensive and yet highly suitable for its use, including effective, unimpeded ventilation in any desired direction.

This has been achieved by means of vented lens and load units comprising novel building blocks of modular, cellular construction, and by new ways of combining modular, cellular elements and blocks in the construction of lenses and loads. The improvement is based on the use of generally flat, conveniently molded or shaped, dielectric modular units or "modules," providing when united an open-work system of three-dimensionally inter-communicating cells, through which ventilating currents can be passed in any desired direction or directions. The new modules are convenient to fabricate and are easy to combine into lens and load constructions at least as advantageous, electronically, as earlier ones and providing for uniquely flexible application of ventilation air streams.

Figure 2:
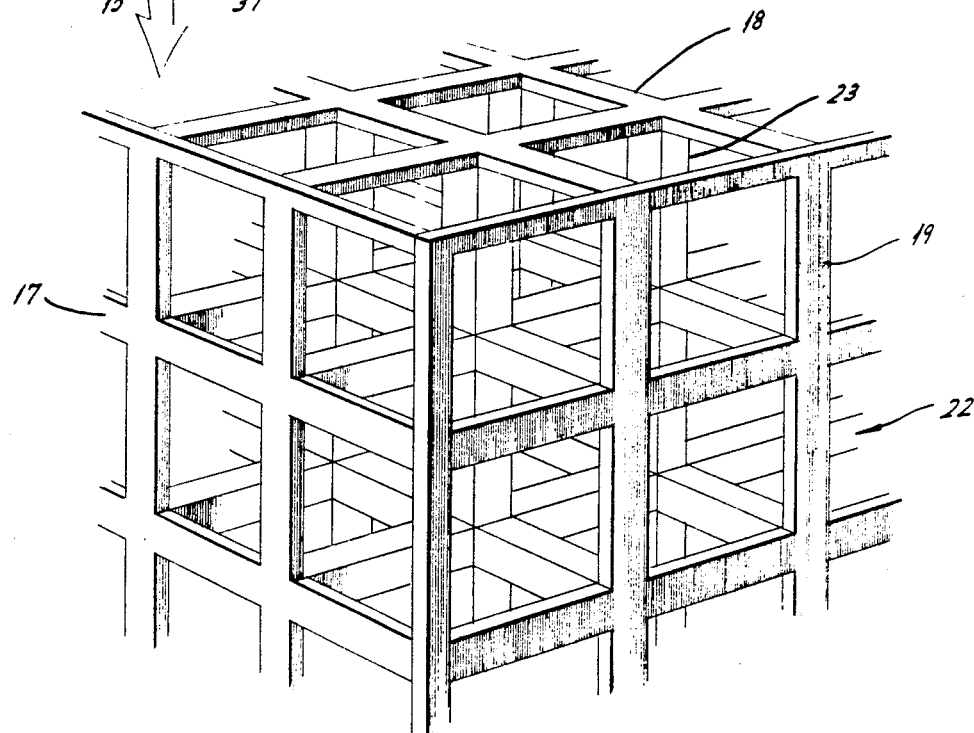
Figure 5:
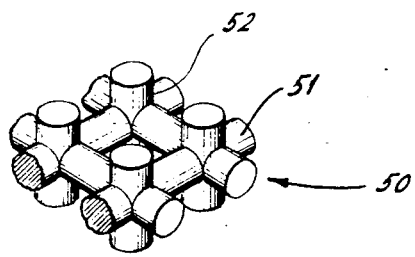
Figure 3:
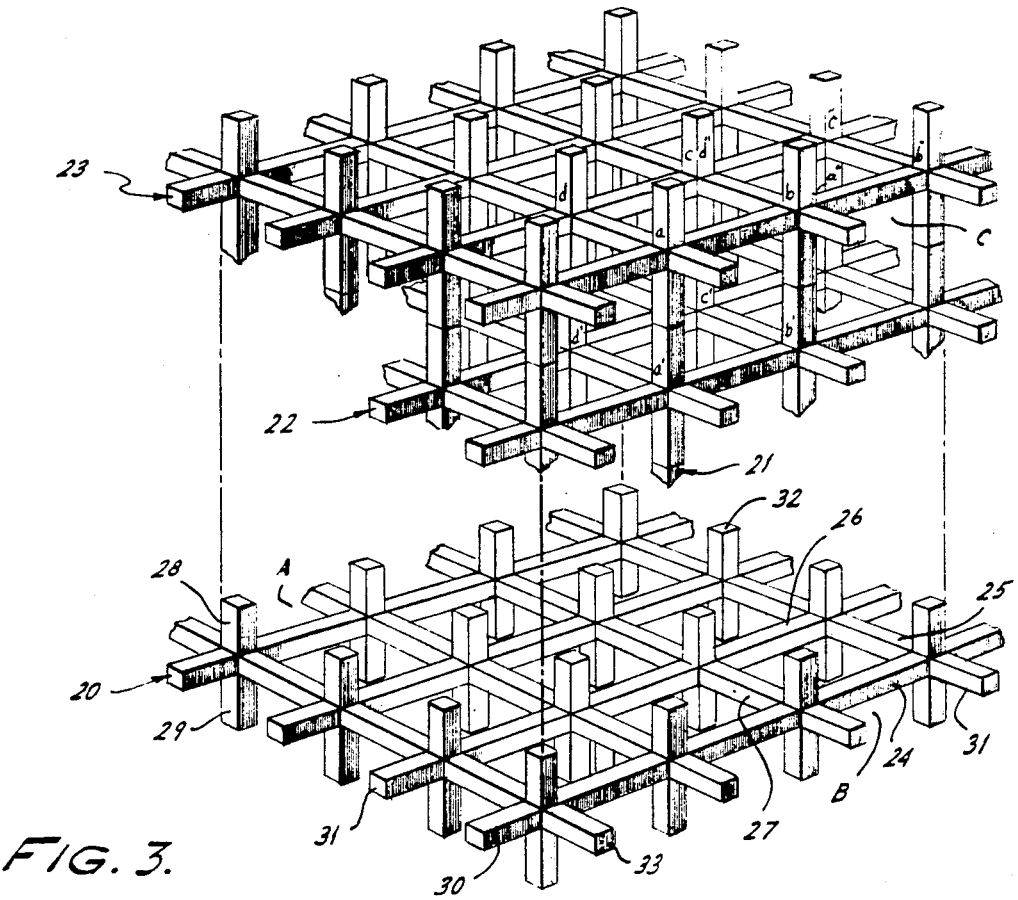
Figure 4:
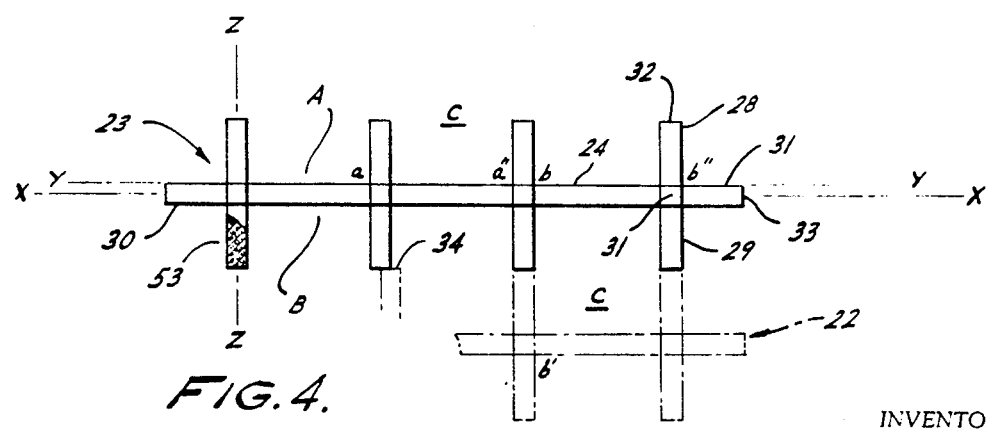
Figure 6:
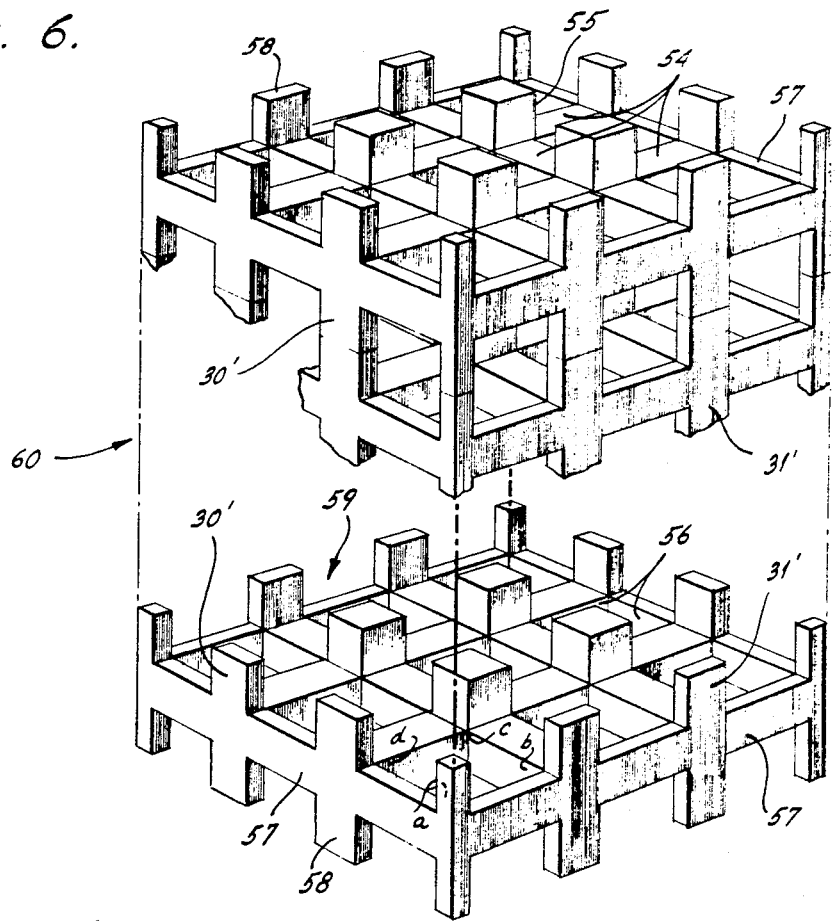
Figure 7:
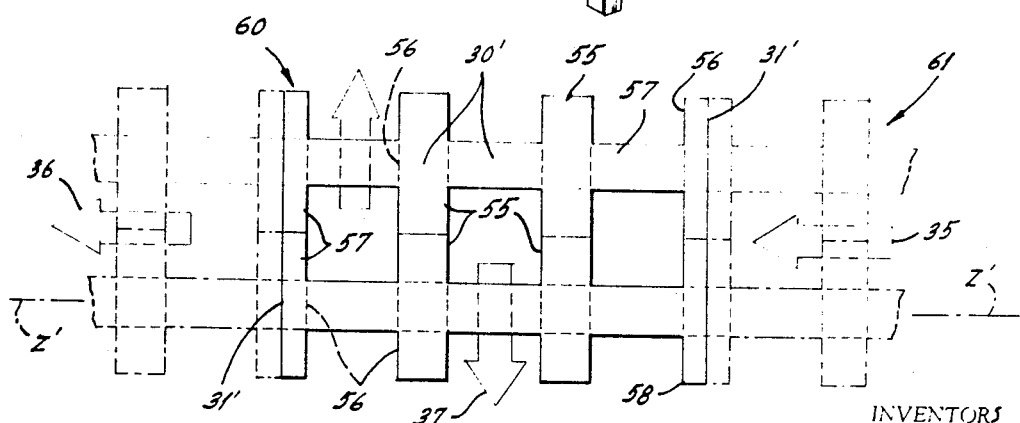

The new construction will be understood and appreciated more fully on consideration of the preferred embodiments shown in the drawing appended hereto. FIGURE 1 is a perspective view of one kind of lens constructed and ventilated in accordance with the invention. FIGURE 2 shows a detail from FIGURE 1, in similar view but on a greatly enlarged scale in comparison with FIGURE 1, to disclose the new ventilatable cellular structure, the dimensions of this figure being enlarged also in comparison with typical, actual dimensions of certain building blocks in accordance herewith. FIGURE 3, drawn on a scale slightly smaller than FIGURE 2, shows internal construction features of the aforementioned detail area, again in perspective view but wherein surface plates or grids are completely removed and some of the internal components are removed completely or in part. FIGURE 4 is an edge view of a modular element, embodying the invention. FIGURE 5 shows a modified form thereof in perspective, fragmentary view. FIGURES 6 and 7 show another modification in views corresponding respectively to those of FIGURES 3 and 4.

A great variety of forms can be used for lenses and loads, depending on the desired patterns of microwave refraction, transmission, absorption, etc.; for instance, lenses can be built in spherical form (Luneberg lenses etc.) or with spherical segments as front or back surfaces, or cylindrically, or in form of prisms, and otherwise. However, in FIGURE 1, lens 10 is shown as a plano-convex body of square outline. It has a square planar front surface 11 and a square but curved back surface 12. Lateral surfaces 13, 14 are shown as being planar. The lens is shown as collecting incident energy, beam 15, and emitting such energy in a pattern of convergent shape, indicated at 16.

For this purpose the lens is made of known dielectric material suitable chosen to provide a predetermined degree of retardation of incident waves and thereby, in conjunction with the plano-convex lens shape, to provide the desired refraction and shaping of the wave pattern. In addition the lens material must provide other characteristics such as tensile strength, electrical and thermal resistivity, etc. By way of example, certain polystyrene or epoxy resins as well as glasses and ceramics, with or without metal load particles or so-called obstacles therein, are suitable for such purposes.

As already noted it is known to be desirable in most cases to remove heat, generated in the lens incident to the retardation of microwaves and the dissipation of wave energy. It is also known that, when some predetermined dielectric material is used, the ratio of dielectric-filled space to total space of the lens determines the effective dielectric constant and thus controls the refraction achieved by the lens. Lenses have heretofore been composed of dielectric material permeated by a system of open regions, and in some cases such regions could be used for certain types of heat-controlling ventilation. In particular, prior constructions have used open regions of tubular shape, arranged in parallel patterns or bundles, which could be employed in this way.

Instead of such prior arrangements the new lens structure, as indicated by FIGURE 2, comprises an internal system of hollow cubical cells, while the outside of this system is finished by perforated walls or flat grid structures 17, 18 and 19 of suitably selected character as to wave reflection, refraction, and tensile strength. These outer walls are here shown as having smooth outer surfaces.

The internal cell system, providing the body of the lens, is best illustrated in FIGURE 3. It comprises a three dimensional gridwork which, according to a particular aspect of the invention, is built up from individual, flat modules or building units 20, 21, 22 and 23. Portions of the upper two of these modules are shown in FIGURE 2, while FIGURE 3 shows uppermost and lowermost modules 20, 23 in full and indicates intermediate modules 21, 22 in part. The upper portion of this figure shows how mutually overlying modules are oriented one relative to the other and how they are interconnected, while the lower portion of the figure shows one of the modules, 20, by itself. Another module, 23, is shown in edge view in FIGURE 4, a next lower module 22 being shown in this latter figure in broken lines.

From FIGURES 3 and 4 it will be understood that a cubical module block 20 to 23 is composed of four square modules 20 etc. As more fully shown in FIGURE 3 each individual, square module 20 is a perforated body, the perforations of which are in register with those of superposed layers of modules in the generally cubical module block 20 to 23. Substantial numbers of these latter blocks can be combined to form a complete lens such as that of FIGURE 1. It is however possible also to consider an individual module block or cube, such as that of FIGURE 3, as a self-contained load unit of the indicated type.

The smallest functional unit of such a block is a cubical cell, defined by eight corners: the corners identified by letters $a, b, c, d$ in one layer or module 23, and those called $a', b', c', d'$ in the underlying layer 22. FIGURE 3 is drawn to indicate a cubical block of twenty-seven (three times three times three) such cubical cells, plus certain partial cells or half cubes, disposed around the outsides of the cubical block as will be explained hereinafter. Each cubical cell is shown as having a hollow interior, communicating with the outside thereof through six apertures, one in each of the six side surfaces of the cube. Thus the material is of three dimensionally open-sided construction throughout, so that it can be freely traversed and cooled by air currents or blasts in each or all of the directions available in space (FIGURE 1). It will be understood that laterally adjoining, elementary cubes have corners $a'', b'', c'', d''$ coinciding with some of the aforementioned corners; see for instance coincident corners $a'', b$ and $d''$, $c$ in FIGURE 3.

Considering now certain details of the new structure, it is important to note that the new module block of FIGURE 3 consists of four flat modules 20 to 24, providing the three layers of cubical cells.

As illustrated, the new module combination provides this cellular structure of the module block unit by means of peculiar side, post, and arm members. Every individual square, such as $a, b, c, d$, has four side members or bar-like elements 24, 25, 26, 27, the intersections of which provide the aforementioned corners. At each of these corners a pair of stud or post elements 28, 29 is provided, extending transversely of the plane $abcd$. Each individual module, for instance 20, is illustrated as lying in a horizontal plane and the studs are shown as projecting upwardly and downwardly therefrom, being at right angles to the side members 24, 25, etc. and one stud 28 being in line with the other 29.

In a broad sense, accordingly, our invention provides a module block 20, 21, 22, 23 composed of hollow, intercommunicating cells. According to another aspect the invention provides an individual module, such as 20, such module being specially and characteristically formed so as to comprise a pair of oppositely facing half cell structures. This arrangement is perhaps best shown in FIGURE 4, where it will be noted that module 23 provides upper half cells A and lower half cells B, arranged back to back, and that complete cells C are provided by combining two modules 22, 23 and utilizing upper half cells of the one and lower half cells of the other.

As indicated by FIGURE 5, it is possible to vary the ratio of dielectric-filled space to total space. In this figure the solid elements of a module 50 are shown relatively heavy. Module 50 can, for instance, be molded or formed with rounded side members 51 and rounded studs 52.

It is further possible to vary the forms of boundary surfaces for the module blocks. In FIGURES 3 and 4, lateral studs or arms 30, 31 are shown, extending from outer portions of the module in the general plane of side members 24, 25 etc. and in line therewith, at each intersection of outermost sides. However, modules can also have flat outer side surfaces, disposed in planes Z—Z (FIGURE 4). Such a modified module block structure is shown in FIGURES 6 and 7. It presents flat outer side surfaces 30', 31', instead of the projecting side arms 30, 31 of FIGURES 3 and 4. Construction of a complete lens can thus be facilitated, since entanglement of arms 31 is thus avoided and adjoining module blocks are more easily kept in proper relationship to one another, by surface contact along flat surfaces 30' etc.

The modified structure is shown in a form which somewhat resembles that of a chocolate bar or waffle, with relatively massive, cornered sides 54 and studs 55 and with relatively small perforations between these sides. While the drawings show a square ground plan for the cell structures, the pattern could be hexagonal as in a honeycomb with intercommunicating cells, or the perforations could for instances be generally round in plan view. It is however desirable that the perforations be prism-like, so that their surrounding side structures as well as the studs be outlined by straight parallel boundaries 56, in directions across the plane of the module. It then becomes possible to maintain proper ventilation 35, 37 etc. even when widely varying the solid-to-space ratio in a lens or load unit and the corresponding indices of refraction. In addition, these indices are then proportional to the respective weights of the blocks, thereby facilitating selection of suitable blocks in the construction of loads and the like.

As a further development, outermost sides 57 and outermost studs 58 of a module 59 and module block 60 according to FIGURES 6 and 7 are made half as thick as inner sides 54 and posts 55, thus providing standard thickness of all structure elements when the several building blocks 60, 61, etc. have been combined by placing their flat surfaces 31' etc. into contact with one another. Similarly thin, flat surfaces can also be provided at upper and lower ends of a module block, by providing terminal module structures with flat upper or lower surfaces lying in planes Z' and using studs 55 only in the interior of a block.

Of course the new module blocks can be made of more or less porous or foam-like dielectric materials, as is indicated by FIGURE 4 in the partly broken-off portion 53. Still further, while FIGURES 3, 4 ,6 and 7 show constructions with nine (three times three) cell areas $abcd$ per module, it is possible to provide a module with more or fewer cell areas, for instance with one or more elongate rows of cell areas arranged in one horizontal direction, and with some suitable number of cell areas in the other horizontal direction. It will be seen that the new arrangement provides almost unlimited possibilities for the construction of a homogeneous and effective module block, having desirable and accurately predictable characteristics as to wave refraction and having equally desirable arrangement for effective management of heat and temperatures.

Such a block can be produced by extremely simple fabricating methods, including a molding technique for each module, which technique is known by itself from the fabrication of other plastic structures. A module 20, complete with side and stud and arm members 24 to 31, is conveniently formed for instance between a pair of mold elements, not shown, which can be separated for instance in the approximate center plane X—X of the module (FIGURE 4) or if preferred, in a plane parallel thereto such as Y—Y.

For the purpose of building up a module block, we then combine upper stud end surfaces 32 of each lower module with similar lower surfaces of an upper module, and interconnect them for instance by suitable cementing or plastic-welding techniques. We can then build up a lens from the so-produced module blocks, for instance by similarly combining and interconnecting side arm surfaces 33. In such operations, pluralities of mating end surfaces 32 or 33 are readily aligned with one another, to establish accurately cubical cells, by suitable alignment of two or three randomly chosen pairs of studs. In some cases (as shown in FIGURE 4 at 34) some displacement can be used between mating surfaces, for instance for the purpose of adapting the cell structure to curved boundaries of the lens, for instance a convex rear surface 12 in FIGURE 1.

It is also possible to utilize building blocks incorporating our invention and which at the same time have different shapes and different indices of refraction. For instance, we can make the core of a lens from modules proportioned as shown in FIGURE 5 and formed of material with relatively high index, while making outer portions of the lens from materials with progressively lower indices and from blocks with progressively thinner side and stud members.

In operation, as already indicated, retardation of waves from incident beam 15 (FIGURE 1) is accompanied by absorption of wave energy in the lens or load, tending to heat the lens or load. If such heating were continued unchecked, it would lead to serious problems, such as geometric distortion of the structure, change of electromagnetic characteristics, and loss of mechanical strength.

The structure is therefore ventilated and cooled, for instance by air stream 35. As schematically indicated in the drawing, the incoming air of this stream can be introduced through a side surface 14; it can then be withdrawn, under the guidance or control of suitable equipment, not shown, either 36 through an opposite side surface, or 37 through a bottom or top surface of the lens, or 38 forwardly or backwardly, or in still other ways (not shown). Variations as to such arrangements can be selected by air passage and control equipment, not shown, suitably connected to the lens, and by virtue of the flexibility of the ventilation pattern such equipment can be arranged as may be dictated by any features or requirements of electronic waveguides and other associated structures, not shown. Briefly, the open, three dimensionally communicating cell structure provided by the invention allows flexible as well as unobstructed use of desired patterns of ventilation.

In every selected pattern of air streams, the new structure provides effective, forcible ventilation of all internal dielectric portions of air circulating and eddying through the structure and contacting all of the internal elements. By virtue of the use of substantially regular, uniform arrays of cell polygons, in all modules, perfect alignment of stud surfaces 32 and corresponding cells is readily achieved, and irregular internal obstructions of air streams are minimized.

While only a single embodiment of the invention has been fully described, the details thereof are not to be construed as limitative of the invention. The invention contemplates such variations and modifications as come within the scope of the appended claims.

We claim:
1. As an element of a wave manipulating unit, such as a microwave lens: a generally flat grid-like system of dielectric bar and stud members integrally interconnected in mutually intersecting relationship, said system comprising (a) bar members arranged as a flat, perforate array of polygons, such as squares, and (b) stud members associated with said array, a pair of said stud members being provided at each corner of said polygons, and each stud member of such a pair projecting from one of the two flat sides of said array, whereby air can be passed into and from the unit, formed of such systems, in all directions between the various stud members and through said polygons.

2. A system as described in claim 1, also including side extensions, each generally similar to one of said stud members but projecting outwardly from outermost corners of each polygon, in the plane of said flat array.

3. In a wave energy transferring structure: a plurality of generally planar recessed dielectric modules, disposed in mutually superposed planes and each comprising (a) a grid-like system of bar members arranged in regular, cornered, geometric forms, such as squares, and (b) in each corner of such forms, post means extending transversely with respect to the grid-like system and interconnecting such grid-like systems in such a way as to afford a three-dimensionally combined, three-dimensionally intercommunicating cell structure formed by said bar and post members.

4. In a structure as described in claim 3, perforated dielectric end plate means arranged to provide outermost walls of said cell structure.

5. As a module for the construction of a cellular body to retard or absorb electromagnetic wave energy, a skeleton structure substantially consisting of dielectric material and providing (a) a system of bar-like elements of approximately uniform length shorter than the wavelength of said electromagnetic wave energy, said elements being oriented substantially in a single plane and being joined together in a system of intersections and (b) a system of stud-like elements each approximately half as long as said bar-like elements, each extending through one of said intersections, upwardly and downwardly relative to said plane, whereby the skeleton structure provides a pair of sets of half cells, facing in opposite directions.

6. A structure as described in claim 5 wherein said bar-like and post-like elements have substantially uniform cross-sectional shapes and substantially uniform terminal surfaces.

7. In a vented structure for wave refraction and related functions:
a system of modules, each comprising (a) an open gridwork of dielectric members and substantially lying in one plane and mutually joined in a system of intersection areas, and (b) mutually spaced projections, one projecting from each of said intersection areas, transversely of and on each side of said plane, and
means connecting end surfaces of said projections to similar surfaces on adjacent and oppositely facing modules.

8. Apparatus for wave refraction or retardation, comprising:
a three-dimenisonal system of flat modules, each including (a) a flat, open gridwork of dielectric members, mutually joined in a system of intersection areas, and (b) mutually spaced projections, at least one projecting from each of said areas, transversely of said plane, and with end surfaces of said projections connected to similar surfaces on adjacent and oppositely facing modules;
means for conducting a cooling current into said system through any portion of the surface of the system, and
means for removing the used current from said system through another surface portion of the system.

References Cited by the Examiner
UNITED STATES PATENTS
2,921,312   1/1960   Wickersham _____ 343—756
FOREIGN PATENTS
82,705   5/1947   Denmark.

HERMAN KARL SAALBACH, *Primary Examiner.*
W. K. TAYLOR, E. LIEBERMAN, *Assistant Examiners.*